No. 644,907. Patented Mar. 6, 1900.
G. E. GAY.
SCREW DRIVER.
(Application filed Oct. 26, 1899.)
(No Model.)
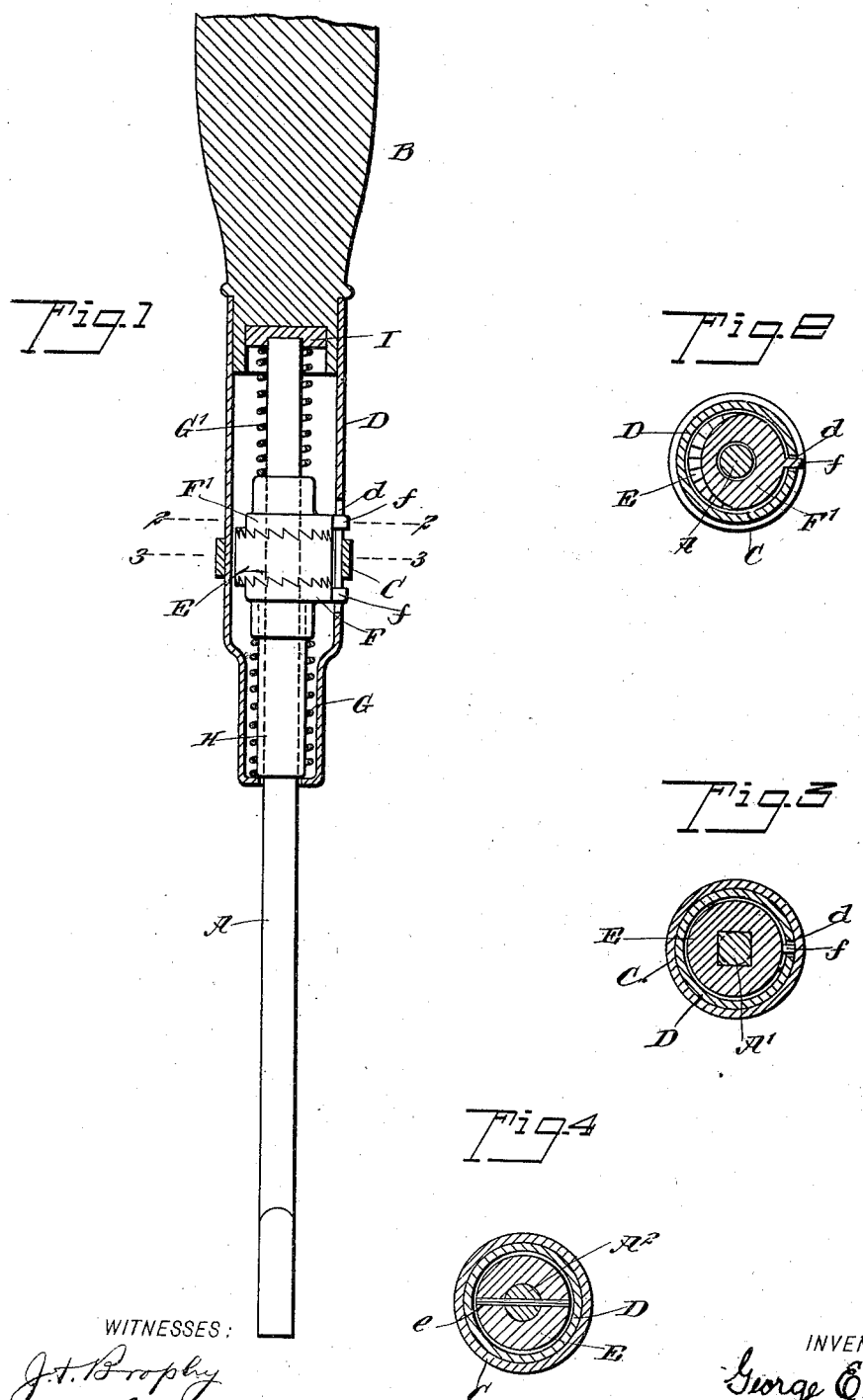
WITNESSES:
J. H. Brophy
H. L. Reynolds.
INVENTOR
George E. Gay
BY
ATTORNEYS
THE NORRIS PETERS CO., PHOTO-LITHO., WASHINGTON, D. C.

UNITED STATES PATENT OFFICE.

GEORGE E. GAY, OF AUGUSTA, MAINE.

SCREW-DRIVER.

SPECIFICATION forming part of Letters Patent No. 644,907, dated March 6, 1900.

Application filed October 26, 1899. Serial No. 734,795. (No model.)

*To all whom it may concern:*

Be it known that I, GEORGE E. GAY, of Augusta, in the county of Kennebec and State of Maine, have invented a new and Improved Screw-Driver, of which the following is a full, clear, and exact description.

My invention relates to an improvement in ratchet screw-drivers, and comprises the novel features which are hereinafter described, and pointed out in the claims.

Reference is to be had to the accompanying drawings, forming a part of this specification, in which similar characters of reference indicate corresponding parts in all the figures.

Figure 1 is a longitudinal section through my device. Fig. 2 is a section upon the line 2 2 of Fig. 1. Fig. 3 is a section upon the line 3 3 of Fig. 1, and Fig. 4 is a similar section of a modification.

My device consists of a screw-driver which is provided with means by which it may be made reversible—that is, so that it may be used for turning the shank or blade in either direction.

Upon the handle B is mounted a tubular shell or ferrule D, forming a casing for the ratchet mechanism, and at its outer end preferably somewhat reduced in diameter and provided with an opening of such size as to accommodate the shank or blade A.

In the body of the casing or ferrule D is constructed a longitudinally-extending slot $d$, and within the ferrule and mounted to turn with the shank or blade A is an apertured ratchet or clutch disk E, which is provided with teeth upon its opposite end faces. The aperture in this disk, as shown in Fig. 3, is made square, and a short section A' of the shank A is also made square to fit the aperture in said disk. The shank should preferably fit in the disk with sufficient tightness so that the disk will not be readily movable upon the shank, but so that it may be removed if it is desired to take the screw-driver apart. If desired, the aperture in the ratchet-disk may be circular, as indicated in dotted lines in Fig. 3 and in full lines in Fig. 4, and means—such, for instance, as a pin $e$, passing through the ratchet-disk and through the part $A^2$ of the blade, which is circular in cross-section—may be employed to hold the blade in the ratchet-disk.

Upon each side of the disk E and loosely mounted, one upon the shank A and the other upon a sleeve H, are the two pawl members F and F', which consist of disks each preferably provided with a sleeve, so as to give it a longer bearing. These disks are provided with teeth upon their faces adapted to engage with the teeth upon the disk E. The pawl members are free to turn and slide, respectively, upon the shank and sleeve and are normally held toward the disk E by means of springs G and G', which have bearing at opposite ends of the ferrule. Each of the pawl members F and F' has an arm $f$, which is constructed integral therewith and projects through the slot $d$ in the ferrule. Between these two arms and surrounding the ferrule is a ring C, which may be moved so as to disengage either one of the pawl members F or F' from the disk E or to leave them both engaged therewith. The shank or blade may thus be left free to turn in the handle in one direction, but engaged by the remaining pawl member, so as to turn with the handle in the other direction or be locked against turning in either direction. The pawl members F and F' are turned with the handle by reason of the engagement of the arms or projections $f$ with the ferrule.

The shank between the outer end of the ferrule and the first pawl member is encircled by the sleeve H, which passes through the pawl member F and engages the face of the ratchet-disk E, thereby preventing the blade from dropping out of the ferrule. The inner end of the blade A bears upon a disk I, which is slightly recessed to receive it and which acts as a thrust-bearing for the blade.

The edges of the disks F and F', which form the pawl members, are relieved or made of smaller diameter upon the side opposite the arms $f$, by reason of which it is possible to insert the parts within the ferrule. Without such a provision the disks F and F' would have to be made considerably smaller or the arms $f$ be made separate from said disks and inserted therein. This last construction would be objectionable, as it would involve more labor and would produce a weaker job than the construction illustrated.

In the operation of the device in order to turn a screw into place the sleeve C is raised by one hand and the sleeve engaging the arm $f$ on the pawl F' releases the engagement between said pawl and the ratchet-disk, and the pawl being kept in such position then by turning the handle B in the usual manner the screw is driven home, after which the pawl is allowed to reëngage the ratchet-disk. To remove the screw, the sleeve C is depressed, thus depressing the pawl F, and said pawl being kept depressed and being in engagement with the ratchet-disk then by turning the handle B in the reverse direction the screw is loosened.

It is to be understood that the ring C is mounted to move with sufficient friction on the ferrule D so that the ring will remain in any position it is placed and will not be returned to its middle position by the force of the pawl-actuating springs.

Having thus fully described my invention, I claim as new and desire to secure by Letters Patent—

1. A ratchet screw-driver, comprising a handle, a blade, a ratchet-disk secured to turn with the blade, two pawl members loosely mounted on the blade and spring-pressed toward the ratchet-disk, a ferrule forming part of the handle and surrounding the disk and pawl members, said ferrule having a longitudinal slot and each pawl member having an arm extending through said slot, and a ring frictionally held on said ferrule and adapted to engage with either arm, said ring being of a width less than the distance between the two arms in their locked position, whereby the device may be used as an ordinary screw-driver, as set forth.

2. A ratchet screw-driver, having a ratchet-disk secured to turn with the shank or blade, two pawl members consisting of disks loosely mounted upon the shank or blade to engage opposite sides of the ratchet-disk, a ferrule or tube forming a part of the handle and closely surrounding the disk and pawl members, said ferrule having a longitudinally-extending slot and the pawl members having integral arms extending through said slot and having the sides opposite the arms relieved or cut away to permit introduction within the ferrule, substantially as described.

3. A ratchet screw-driver, having a ratchet-disk secured to turn with the shank or blade, two pawl members consisting of disks loosely mounted upon the shank or blade to engage opposite sides of the ratchet-disk, a ferrule or tube forming a part of the handle and closely surrounding the disk and pawl members, said ferrule having a longitudinally-extending slot, and the pawl members having integral arms extending through said slot and having the sides opposite the arms relieved or cut away to permit introduction within the ferrule, springs holding the pawl members toward the disk, and a ring mounted to slide outside the ferrule and between said arms, substantially as described.

4. A ratchet screw-driver, having a ratchet-disk secured to turn with the shank or blade, two pawl members loosely mounted upon the shank or blade to engage opposite sides of the ratchet-disk, a ferrule or tube forming a part of the handle and surrounding the disk and pawl members, said ferrule having a longitudinally-extending slot and the pawl members having arms extending into said slot, springs holding the pawl members toward the disk, a ring mounted to slide outside the furrule and between said arms, and a sleeve encircling the shank and engaging the disk with one end and the end of the ferrule with its other end, substantially as described.

GEORGE E. GAY.

Witnesses:
JOHN A. GARDNER,
DANIEL D. BUSH.